United States Patent
Hande et al.

(10) Patent No.: US 12,052,603 B2
(45) Date of Patent: Jul. 30, 2024

(54) GROUP-BASED WIRELESS COMMUNICATIONS

(71) Applicant: QUALCOMM Incorporated, San Diego, CA (US)

(72) Inventors: Prashanth Haridas Hande, San Diego, CA (US); Chih-Ping Li, San Diego, CA (US); Peerapol Tinnakornsrisuphap, San Diego, CA (US); Rajat Prakash, San Diego, CA (US); Xipeng Zhu, San Diego, CA (US); Yih-Hao Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 17/166,420

(22) Filed: Feb. 3, 2021

(65) Prior Publication Data

US 2022/0248255 A1    Aug. 4, 2022

(51) Int. Cl.
*H04L 1/20*      (2006.01)
*H04W 28/02*    (2009.01)
(Continued)

(52) U.S. Cl.
CPC ......... *H04W 28/0268* (2013.01); *H04L 1/203* (2013.01); *H04W 28/04* (2013.01); *H04W 28/18* (2013.01)

(58) Field of Classification Search
CPC . H04W 28/0268; H04W 28/04; H04W 28/18; H04L 1/203
(Continued)

(56) References Cited

U.S. PATENT DOCUMENTS

2003/0231659 A1* 12/2003 DiMambro ............... H04L 9/40
 370/473
2008/0181250 A1* 7/2008 Koski ............... H04W 74/0808
 370/445
(Continued)

FOREIGN PATENT DOCUMENTS

WO    WO-2017100394 A1    6/2017

OTHER PUBLICATIONS

DVB Project Office: "TM4701-1r5_NGH Specification drEN 303105-1 V1.0.0", DVB, Digital Video Broadcasting, C/O EBU—17A Ancienne Route—CH-1218 Grand Saconnex, Geneva—Switzerland, No. 5, Jan. 19, 2021 (Jan. 19, 2021), XP017860097, pp. 1-248, Retrieved from the Internet: URL: https://member.dvb.org/wg/TM/documentRevision/download/45310 TM4701-1r5_NGH Specification drEN 303105-1 v1.1.1.doc [retrieved on Jan. 19, 2021] the whole document.

(Continued)

*Primary Examiner* — Xuan Lu
(74) *Attorney, Agent, or Firm* — Holland & Hart LLP

(57) ABSTRACT

Methods, systems, and devices for wireless communications are described. A device may aggregate multiple data bits into a group of data bits associated with an application on the device. The device may determine quality of service parameters associated with the group of data bits. The quality of service parameters may include an error rate associated with the group of data bits, a delay budget associated with the group of data bits, timing information associated with the group of data bits, or content policy information associated with the group of data bits, or a combination thereof. The device may transmit the group of data bits to another device in the wireless communication system. The group of data bits may include group header information including an indication of the quality of service parameters.

20 Claims, 10 Drawing Sheets

(51) Int. Cl.
*H04W 28/04* (2009.01)
*H04W 28/18* (2009.01)

(58) Field of Classification Search
USPC .......................................... 370/229
See application file for complete search history.

(56) References Cited

U.S. PATENT DOCUMENTS

| | | | |
|---|---|---|---|
| 2013/0046863 A1* | 2/2013 | Bastian | H04L 47/24 |
| | | | 709/220 |
| 2014/0269378 A1* | 9/2014 | Holbrook | G11C 11/4076 |
| | | | 370/252 |
| 2017/0280474 A1* | 9/2017 | Vesterinen | H04L 41/50 |
| 2019/0132251 A1* | 5/2019 | Dao | H04L 69/22 |
| 2019/0253917 A1* | 8/2019 | Dao | H04M 15/00 |
| 2020/0229206 A1* | 7/2020 | Badic | H04W 16/32 |
| 2020/0267753 A1* | 8/2020 | Adjakple | H04W 72/1268 |
| 2020/0413457 A1* | 12/2020 | Hong | H04W 76/10 |
| 2021/0111841 A1* | 4/2021 | Ohta | H04W 76/27 |
| 2021/0409301 A1* | 12/2021 | Salkintzis | H04L 43/0864 |
| 2021/0409335 A1* | 12/2021 | Zhu | H04L 47/24 |
| 2022/0174539 A1* | 6/2022 | Dao | H04M 15/8228 |

OTHER PUBLICATIONS

International Search Report and Written Opinion—PCT/US2021/072598—ISA/EPO—Mar. 17, 2022 (208899WO).

* cited by examiner

GROUP-BASED WIRELESS COMMUNICATIONS

FIELD OF TECHNOLOGY

The following relates to wireless communications, including group-based wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support group-based wireless communications. A device may be configured to aggregate data bits into a group of data bits associated with an application on the device. The group of data bits may be referred to as a "chunk" of data, a payload, or a data bit group. The device may transmit the group of data bits to a network device, such as an Enhanced Data GSM Environment (EDGE) server, another UE, or a base station in the wireless communication system. The device may transmit the group of data bits based on a bit group protocol data unit (PDU) session established between the device and the network device. In some examples, the device may aggregate the data bits into a group of data bits, without packetization (e.g., without packetizing the data bits into data packets or groups of data packets).

Additionally or alternatively, the group of data bits may be included in a bit group PDU. A bit group PDU may include protocol-specific control information and user data. For example, a bit group PDU may include a group of data bits and a header associated with the group of data bits. The header may include information associated with delivery of the group of data bits. The header may include protocol layer information and group header information. The protocol layer information may be associated with the PDU session. For example, the protocol layer information may include transport layer information associated with transporting the group of data bits. The group header information may include quality of service (QoS) parameters associated with the group of data bits.

A method is described. The method may include aggregating a set of multiple data bits into a group of data bits associated with an application on the first device, determining a set of quality of service parameters associated with the group of data bits, and transmitting the group of data bits to a second device in the wireless communication system, the group of data bits including group header information including the set of quality of service parameters.

An apparatus is described. The apparatus may include a processor, memory in electronic communication with the processor, and instructions stored in the memory. The instructions may be executable by the processor to cause the apparatus to aggregate a set of multiple data bits into a group of data bits associated with an application on the apparatus, determine a set of quality of service parameters associated with the group of data bits, and transmit the group of data bits to a second device in the wireless communication system, the group of data bits including group header information including the set of quality of service parameters.

Another apparatus is described. The apparatus may include means for aggregating a set of multiple data bits into a group of data bits associated with an application on the apparatus, means for determining a set of quality of service parameters associated with the group of data bits, and means for transmitting the group of data bits to a second device in the wireless communication system, the group of data bits including group header information including the set of quality of service parameters.

A non-transitory computer-readable medium storing code is described. The code may include instructions executable by a processor to aggregate a set of multiple data bits into a group of data bits associated with an application on a first device, determine a set of quality of service parameters associated with the group of data bits, and transmit the group of data bits to a second device in the wireless communication system, the group of data bits including group header information including the set of quality of service parameters.

Some examples of the method, apparatuses, and non-transitory computer-readable medium described herein may further include operations, features, means, or instructions for establishing a data group protocol data unit session between the first device and the second device, where transmitting the group of data bits may include operations, features, means, or instructions for transmitting the group of data bits to the second device in the wireless communication system based on the data group protocol data unit session.

Some examples of the method, apparatuses, and non-transitory computer-readable medium described herein may further include operations, features, means, or instructions for transmitting, in a header associated with the group of data bits, protocol layer information and the group header information, where the protocol layer information includes transport layer information associated with the group of data bits.

Some examples of the method, apparatuses, and non-transitory computer-readable medium described herein may further include operations, features, means, or instructions for refraining from packetizing the group of data bits, where aggregating the set of multiple data bits into the group of data bits may be based on the refraining from packetizing the group of data bits.

Some examples of the method, apparatuses, and non-transitory computer-readable medium described herein may further include operations, features, means, or instructions for determining that a quantity of groups of data bits satisfy an error rate associated with the group of data bits during a duration. In some examples of the method, apparatuses, and non-transitory computer-readable medium described herein, the error rate corresponds to a ratio of the quantity of groups of data bits that include at least one data bit in error to the number of groups of data bits transmitted over the duration. In some examples of the method, apparatuses, and non-transitory computer-readable medium described herein, transmitting the group of data bits includes transmitting the group of data bits to the second device in the wireless communication system based on the quantity of groups of data bits satisfying the error rate.

Some examples of the method, apparatuses, and non-transitory computer-readable medium described herein may further include operations, features, means, or instructions for determining that a quantity of groups of data bits satisfy a delay budget associated with the group of data bits during a duration, where transmitting the group of data bits includes transmitting the group of data bits to the second device in the wireless communication system based on the quantity of groups of data bits satisfying the delay budget.

Some examples of the method, apparatuses, and non-transitory computer-readable medium described herein may further include operations, features, means, or instructions for storing the group of data bits in a queue for a duration based on the timing information, where the duration may be greater than a period associated with the delay budget.

Some examples of the method, apparatuses, and non-transitory computer-readable medium described herein may further include operations, features, means, or instructions for assigning a priority to at least one data bit of the group of data bits based on content associated with the at least one data bit In some examples of the method, apparatuses, and non-transitory computer-readable medium described herein, the content policy information associated with the group of data bits includes one or more of: a first indication of the priority assigned to the at least one data bit of the group of data bits, a second indication indicating that the group of data bits are processed based at least in part on receiving all data bits of the group of data bits, a third indication indicating that the group of data bits are processed up to a first bit in error of the group of data bits, or a fourth indication indicating that the group of data bits are processed based at least in part on receiving a target number of data bits of the group of data bits. In some examples of the method, apparatuses, and non-transitory computer-readable medium described herein, the target number of data bits is indicated in the content policy information.

Some examples of the method, apparatuses, and non-transitory computer-readable medium described herein may further include operations, features, means, or instructions for determining a value of a transmission parameter based on an error rate associated with the group of data bits, where transmitting the group of data bits may include operations, features, means, or instructions for transmitting the group of data bits to the second device in the wireless communication system based on the value of the transmission rate parameter.

In some examples of the method, apparatuses, and non-transitory computer-readable medium described herein, the transmission parameter comprises a modulation and coding scheme parameter, a transmission block error rate parameter, a power control parameter, or a link adaptation parameter, or a combination thereof.

In some examples of the method, apparatuses, and non-transitory computer-readable medium described herein, a delay budget associated with the group of data bits includes a delay from a time of ingress of a first data bit or a last data bit of the group of data bits at a specified node till an egress of the first data bit or the last data bit of the group of data bits at the specified node.

Some examples of the method, apparatuses, and non-transitory computer-readable medium described herein may further include operations, features, means, or instructions for mapping the group of data bits to one or more quality of service parameters of the set of quality of service parameters and transmitting, to the second device, an indication of the mapping of the group of data bits to the one or more quality of service parameters of the set of quality of service parameters over a control plane or in the group header information, where transmitting the group of data bits to the second device may be based on the indication.

In some examples of the method, apparatuses, and non-transitory computer-readable medium described herein, mapping the group of data bits may include operations, features, means, or instructions for mapping the group of data bits to the one or more quality of service parameters of the set of quality of service parameters based on a routing address associated with one or more data bits of the group of data bits, an identifier associated with streaming the one or more data bits of the group of data bits, an antenna port associated with streaming the one or more data bits of the group of data bits, a type associated with the one or more data bits of the group of data bits, a timestamp associated with the one or more data bits of the group of data bits, or a combination thereof.

In some examples of the method, apparatuses, and non-transitory computer-readable medium described herein, the set of quality of service parameters include an error rate associated with the group of data bits, a delay budget associated with the group of data bits, timing information associated with the group of data bits, or content policy information associated with the group of data bits, or a combination thereof.

In some examples of the method, apparatuses, and non-transitory computer-readable medium described herein, the first device includes an EDGE server and the second device includes a UE.

In some examples of the method, apparatuses, and non-transitory computer-readable medium described herein, the first device includes a UE and the second device includes an EDGE server.

DETAILED DESCRIPTION

Figure 1:
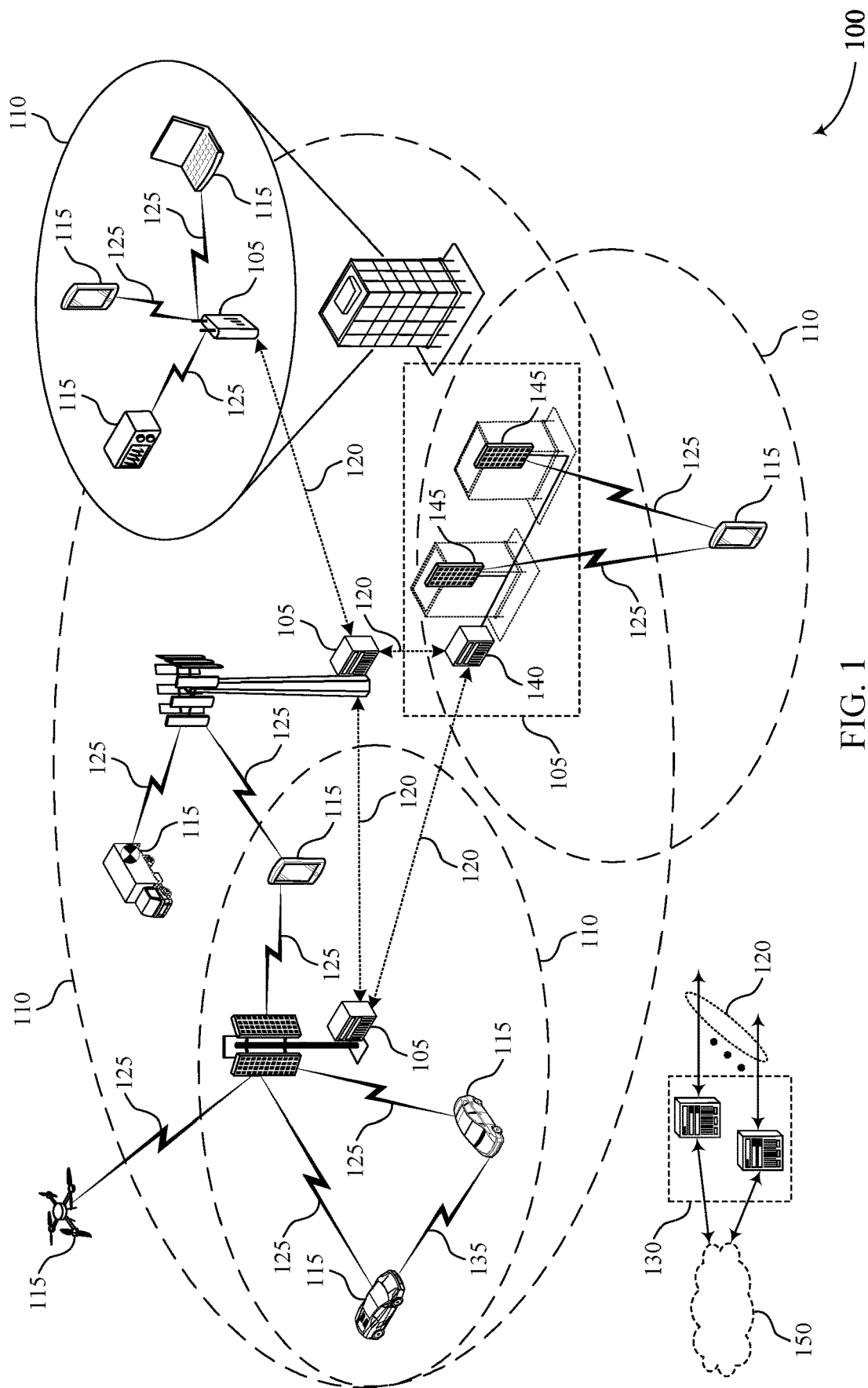
FIG. 1 illustrates an example of a wireless communications system that supports group-based wireless communications in accordance with aspects of the present disclosure.

Some applications on a user equipment (UE) may communicate large amounts of data over a wireless communications system. However, in some wireless communication systems, the UE may be unaware of whether the communicated data is associated with the same group of data unless the data has been packetized. For example, an application running on the UE may communicate data over the wireless communications system using data packets or groups of data packets. An application on a receiving UE may recognize the communicated data as a group of data packets, and in some examples, jointly consume or process the data included in the group of data packets at the same time. For example, the application may jointly consume or process the data packets within the group. However, in some wireless communication systems, transporting data packets or groups of data packets may be associated with relatively high latency, high power consumption, and may be inefficient. For example, processing of data packets or groups of data packets using packet aggregation (e.g., generating data packets or groups of data packets) may increase overhead and complexity.

In some wireless communication systems, signaling information (e.g., headers, group header information) may be utilized to provide data awareness and parameter awareness with respect to data communicated in groups of data packets. For example, in some wireless communication systems, signaling may be communicated to indicate parameters such as a delay budget on a control path and an error rate on the control path with respect to the groups of data packets. Techniques may be desired for communicating relatively large amounts of data along with parameters (e.g., boundaries, error rate, delay budget) associated with the data, without aggregation of the data into data packets. Various aspects of the present disclosure may support a UE configured to aggregate data bits into a group of data bits associated with an application on the UE. The UE may transmit the group of data bits to a network device, such as an EDGE server, another UE, or a base station in the wireless communication system, based on a bit PDU session established between the UE and the network device. The UE may aggregate the data bits into the group of data bits. In some examples, the UE may aggregate the data bits, without packetization (e.g., without packetizing the data bits into data packets or groups of data packets).

The group of data bits (e.g., data bit group) may be included in a bit group PDU. A bit group PDU may include protocol-specific control information and user data. For example, a bit group PDU may include a group of data bits (e.g., data bit group, payload) and a header associated with the group of data bits. The header may include information associated with delivery of the group of data bits. The header may include protocol layer information and group header information. The protocol layer information may be associated with the PDU session. For example, the protocol layer information may include transport layer information associated with transporting the group of data bits. The group header information may include QoS parameters associated with the group of data bits.

The QoS parameters may include an error rate associated with the group of data bits. In some examples, the QoS parameters may include a delay budget associated with the group of data bits. In some other examples, the QoS parameters may include timing information associated with the group of data bits, such as timing information associated with retaining the group of data bits, for example, a discard timer. The discard timer associated with the group of data bits may include a period (e.g., a time) from ingress of the group of bits at a specified node (e.g., a 5G node) till the group of bits are deemed not required for transmission, if not already transmitted. In other examples, the QoS parameters may include content policy information associated with the group of data bits. The content policy information may be indicative of bit priorities associated with the group of data bits.

Aspects of the subject matter described herein may be implemented to realize one or more advantages. The described techniques may support improvements in spectral efficiency and reliability, among other advantages. In some respects, aggregating a group of data bits, without packetization (e.g., without packetizing the data bits into data packets or groups of data packets), and communicating the same over a network may advantageously decrease overhead and complexity at transmitting and receiving devices. In some other aspects, the described techniques may provide for reduced latency and decreased power consumption.

Aspects of the disclosure are initially described in the context of a wireless communications system. Examples of processes and signaling exchanges that support group-based wireless communications are then described. Aspects of the disclosure are further illustrated by and described with reference to apparatus diagrams, system diagrams, and flowcharts that relate to group-based wireless communications.

FIG. 1 illustrates an example of a wireless communications system 100 that supports group-based wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023). Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

A UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The core network 130 may include a data server, a cloud server, a server associated with a multimedia subscription provider, proxy server, web server, application server, communications server, home server, mobile server, or any combination thereof. The server may in some cases include a multimedia distribution platform. The server may include an EDGE server. The multimedia distribution platform may allow UEs 115 to discover, browse, share, and download multimedia via the core network 130 using communications links 125, and therefore provide a digital distribution of the multimedia from the multimedia distribution platform. As such, a digital distribution may be a form of delivering media content such as audio, video, images, without the use of physical media but over online delivery mediums, such as the Internet. For example, the base stations 105 or UEs 115 may upload or download multimedia-related applications for streaming, downloading, uploading, processing, enhancing, etc. multimedia (e.g., images, audio, video). The server may also transmit to the UEs 115 a variety of information, such as instructions or commands (e.g., multimedia-related information) to download multimedia-related applications or data on the UEs 115.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may aggregate data bits into a group of data bits associated with an application on the UE 115. The UE 115 may transmit (or transport) the group of data bits to a network device, such as an EDGE server, another UE 115, or a base station 105 in the wireless communication system 100, based on a bit group PDU session established between the UE 115 and the network device. In some aspects, the UE 115 may aggregate the data bits into a group of data bits. In some examples, the UE 115-a may aggregate the data bits, without packetization (e.g., without packetizing the data bits into data packets or groups of data packets). In some aspects, the group of data bits (e.g., data bit group) may be included in a bit group PDU. A bit group PDU may include protocol-specific control information and user data. For example, a bit group PDU may include a group of data bits (e.g., data bit group, payload) and a header associated with the group of data bits. The header may include information associated with delivery of the group of data bits. The header may include protocol layer information and group header information. The protocol layer information may be associated with the PDU session. For example, the protocol layer information may include transport layer information associated with transporting the group of data bits. The group header information may include QoS parameters associated with the group of data bits.

Figure 2:
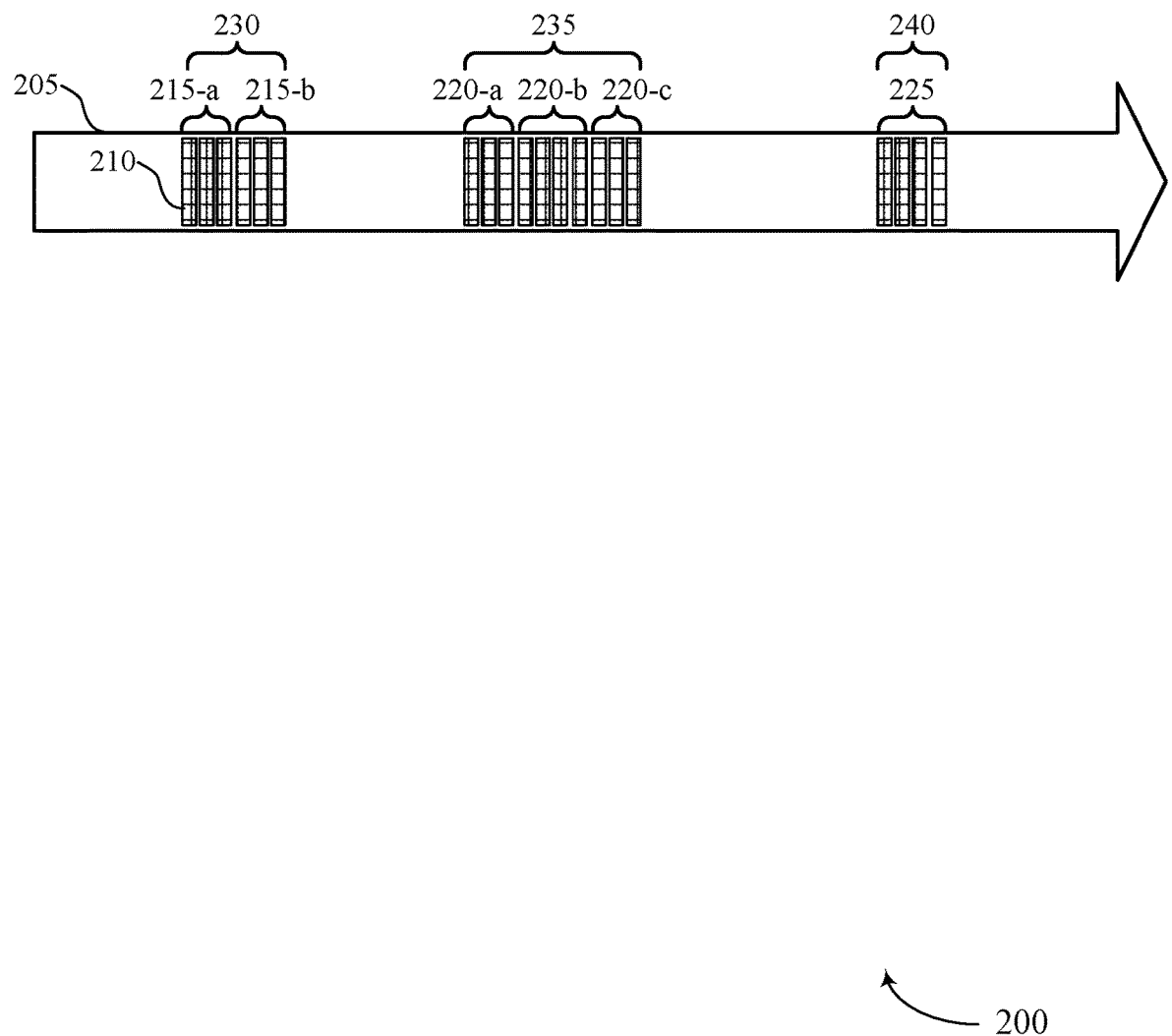
FIG. 2 illustrates an example of a data transmission that supports group-based wireless communications in accordance with aspects of the present disclosure.

FIG. 2 illustrates an example of a data transmission 200 that supports group-based wireless communications in accordance with aspects of the present disclosure. In some examples, the data transmission 200 may be implemented by aspects of the wireless communication system 100 and may be implemented by a UE 115, a server, or a base station 105 described with reference to FIG. 1. In some wireless communication systems, an application on a UE 115 may transmit (and another UE 115 may receive) data over the wireless communications system 100 using data packets 210 (or groups of the data packets 210). In some systems, transporting the data packets 210 (or groups of the data packets 210) may involve packet aggregation (e.g., generating data packets 210), which may be associated with relatively high latency, high power consumption, increased overhead, and increased complexity. In an example, some systems may transmit a group of a data bits (referred to herein as a data bit group) as a group of data packets 210.

For example, in some wireless communication systems, a UE 115 may generate data burst 230, data burst 235, and data burst 240. Each of the data bursts (e.g., data burst 230) may include data (e.g., data files, data bits) generated by an application on the UE 115 at about the same time (e.g., within a temporal duration of each other). For example, each of the data bursts (e.g., data burst 230) may include data bits (or data files) generated within a temporal duration of other data bits (or data files). In an example, the UE 115 may generate and transmit the data burst 230, which may include the data bit group 215-a and the data bit group 215-b. Each of the data bit group 215-a and the data bit group 215-b may include multiple data packets 210. That is, in some systems, data bits included in the data bit group 215-a may be aggregated (e.g., through packetization) into data packets 210, and data bits included in the data bit group 215-b may be aggregated (e.g., through packetization) into data packets 210. Also in some systems, the UE 115 may generate and transmit the data burst 235 (including data bit group 220-a through data bit group 220-c) and the data burst 240 (including data bit group 225). In some systems, an application on a device (e.g., UE 115) may consume data in bigger "chunks" (e.g., a data group 215-a including multiple data packets 210) compared to an individual data packet 210. For example, a video frame may correspond to a burst of data (e.g., data burst 230), or a slice of the video frame may correspond to a burst of data (e.g., data burst 230).

In some examples, a UE 115 may aggregate data bits into a group of data bits (e.g., data bit group 215-a) associated with an application on the UE 115, without packetization (e.g., without packetizing the data bits into data packets 210). For example, the UE 115 may aggregate the data bits into groups of data bits (e.g., data bit group 215-a, data bit group 215-b, data bit group 220-a through data bit group 220-c, data bit group 225), without packetization into the data packets 210. In some examples, each group of data bits (e.g., data bit group 215-a, data bit group 215-b, data bit group 220-a through data bit group 220-c, data bit group 225) may be referred to as a "chunk" of data, a payload, or a data bit group. With reference to FIG. 1, a wireless communications system 100 may provide awareness of parameters associated with each group of data bits (e.g., data bit group 215-a, data bit group 215-b, data bit group 220-a through data bit group 220-c, data bit group 225), such as boundaries, delay budgets, and error rate associated with each group of data bits. The techniques described herein may be advantageous over some systems which provide awareness of parameters associated with each data packet 210, such as packet boundaries, packet delay budget, packet error rates.

By communicating data as groups of data bits (e.g., data bit group 215-a, data bit group 215-b, data bit group 220-a through data bit group 220-c, data bit group 225) without packetization, a wireless communications system 100 may provide for improved communication for power constrained communications. For example, the wireless communications system 100 may deliver the groups of data bits (e.g., data bit group 215-a, data bit group 215-b, data bit group 220-a through data bit group 220-c, data bit group 225) between a UE 115, a base station 105, or a server, in time continuous ON slots. In some examples, such techniques may maximize modem OFF time at a transmitting device or a receiving device (e.g., UE 115, a base station 105, or a server), which may decrease power consumption. In some other aspects, such techniques for delivering the groups of data bits (e.g., data bit group 215-a, data bit group 215-b, data bit group 220-a through data bit group 220-c, data bit group 225), without packetization, may decrease latency associated with transmitting and receiving data compared to communicating the same using the data packets 210.

Delivering the groups of data bits (e.g., data bit group 215-a, data bit group 215-b, data bit group 220-a through data bit group 220-c, data bit group 225), without packetization, may decrease processing overhead and increase throughput compared to communicating the same using the data packets 210. For example, communicating data bits over the data packets 210 may result in the transmission of redundant information (e.g., data packets 210 may carry redundant information). In contrast, communicating the data bits over the groups of data bits (e.g., data bit group 215-a, data bit group 215-b, data bit group 220-a through data bit group 220-c, data bit group 225), without packetization, may reduce or mitigate the amount of redundant information. A UE 115 may determine a size of each group of data bits (e.g., data bit group 215-a, data bit group 215-b, data bit group 220-a through data bit group 220-c, data bit group 225) based on an amount of data bits consumed by an application on the UE 115 or by an application on a device (e.g., another UE 115, a base station 105, a server) receiving the group of data bits. For example, the UE 115 may determine the size of each group of data bits (e.g., data bit group 215-a) based on a minimum granularity of data bits (e.g., a minimum amount of data) that may be processed by the application on the receiving device.

Figure 3A:
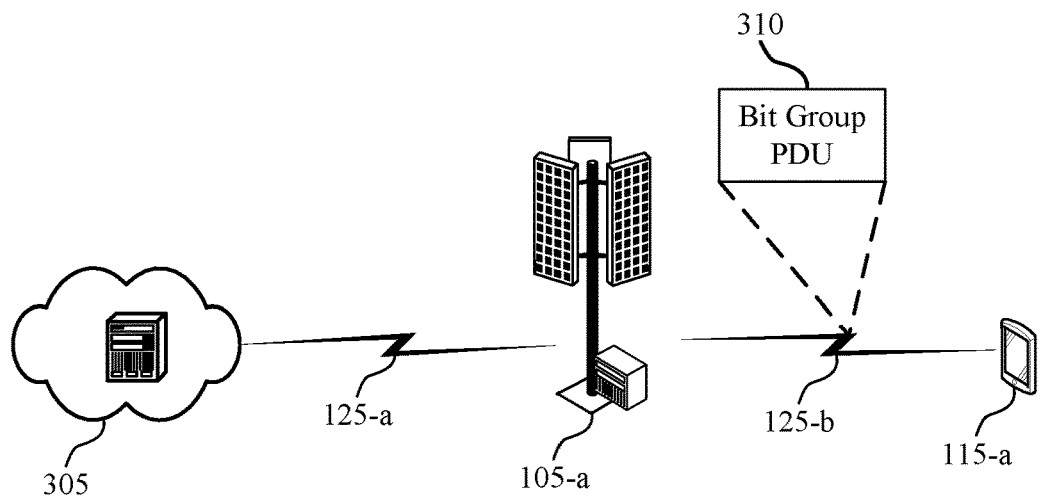
FIG. 3A illustrates an example of a wireless communications system that supports group-based wireless communications in accordance with aspects of the present disclosure.
Figure 3B:
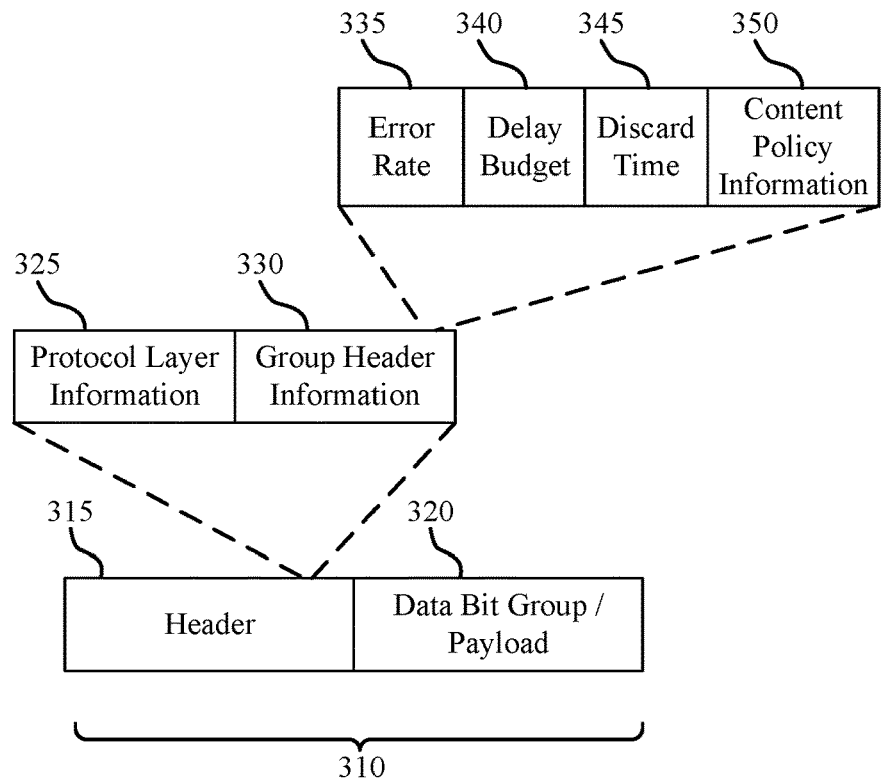
FIG. 3B illustrates an example of a header and a payload that support group-based wireless communications in accordance with aspects of the present disclosure.

FIG. 3A illustrates an example of a wireless communications system 300 that supports group-based wireless communications in accordance with aspects of the present disclosure. In some examples, wireless communications system 300 may implement aspects of wireless communication system 100 and may include a UE 115-a, a base station 105-a, and a server 305, which may be examples of a UE 115, a base station 105, and a server respectively described with reference to FIG. 1. The server may be, for example, an EDGE server. FIG. 3B illustrates an example of a header 315 and a data bit group 320 (or payload) that support group-based wireless communications in accordance with aspects of the present disclosure. As discussed with reference to FIG. 3A and FIG. 3B, the UE 115-a may aggregate data bits into a group of data bits (e.g., data bit group 320) associated with an application on the UE 115-a. The UE 115-a may transmit (or transport) the group of data bits (e.g., data bit group 320) to a network device, such as the server 305, another UE 115, or the base station 105-a in the wireless communication system 300. In some aspects, the UE 115-a may transmit (or transport) the group of data bits (e.g., data bit group 320) based on a bit group PDU session established between the UE 115-a and the network device. In an example, the wireless communications system 300 may support transport of the group of data bits (e.g., data bit group 320) over communication links 125 (e.g., communication link 125-a, communication link 125-b) as described with reference to FIG. 1.

In some examples of the bit group PDU session, the communication link 125-a may provide a communication link between the server 305 (e.g., an EDGE server) and the base station 105-a (e.g., associated with a 5G infrastructure or a future generation infrastructure). In some examples, the communication link 125-b may provide a communication link between the base station 105-a (e.g., associated with a 5G infrastructure or a future generation infrastructure) and the UE 115-a (e.g., associated with the 5G infrastructure or a future generation infrastructure). In some aspects, the UE 115-a may aggregate the data bits into a group of data bits, without packetization (e.g., without packetizing the data bits into data packets or groups of data packets). That is, the UE 115-a may refrain from packetizing the group of data bits (e.g., refrain from packetizing data bits within the data bit group 320). In some examples, the group of data bits (e.g., data bit group 320) may be referred to as a "chunk" of data or a payload. In some aspects, the group of data bits (e.g., data bit group 320) may support relatively large data sizes (e.g., up to 500 kilobytes (KB)).

In some aspects, the transmitting device (e.g., the UE 115-a, the server 305) may refrain from fragmenting (e.g., packetizing) the group of data bits, for example, at the network layer. In some other aspects, the transmitting device (e.g., the UE 115-a, the server 305) may packetize the group of data bits, for example, at the L1 network layer and L2 network layer. In an example, the size of the group of data bits may exceed a threshold for transmitting the group of data bits over the communication links 125 (e.g., the communication link 125-a, the communication link 125-b). A transmitting device (e.g., the UE 115-a, the server 305) may fragment the group of data bits into multiple RLC packets and append a set of L2 headers to the group of data bits. In an example, the transmitting device (e.g., the UE 115-a, the server 305) may transmit the bits (e.g., RLC packets and corresponding L2 headers) over the communications links 125.

In some aspects, the group of data bits (e.g., data bit group 320) may be included in a bit group PDU 310. The bit group PDU 310 may be different from other PDU types. For example, the bit group PDU 310 may be different from an ethernet PDU and an Internet Protocol (IP) PDU types. The bit group PDU 310 may include protocol-specific control information and user data. For example, the bit group PDU 310 may include the header 315 and the group of data bits (e.g., data bit group 320, payload). The header 315 may be associated with the group of data bits (e.g., data bit group 320, payload). For example, the header 315 may include information associated with delivery of the group of data bits (e.g., data bit group 320, payload). In an example, the header 315 may include protocol layer information 325. The protocol layer information 325 may be associated with the bit group PDU session. For example, the protocol layer information 325 may include transport layer information associated with transporting the group of data bits (e.g., data bit group 320, payload).

The header 315 may include group header information 330. In some examples, the group header information 330 may subsume header information for an IP packet, such as IP header information. In some examples, the group header information 330 may subsume header information for a real-time transport protocol (RTP), such as RTP header information. In some aspects, the group header information 330 may include routing information for delivering the group of data bits (e.g., data bit group 320, payload) over the wireless communications system 300 (e.g., via the communication link 125-a and communication link 125-b). In some aspects, the group header information 330 may include antenna port identifiers (or antenna port numbers) associated with a transmitting device (e.g., UE 115-a, the server 305, the base station 105-a, another UE 115). In some aspects, the group header information 330 may include stream identifiers supportive of multiple streams of data (e.g., streaming data). For example, the group header information 330 may include identifiers respectively associated with data bits of the group of data bits (e.g., data bit group 320, payload).

The group header information 330 may include timing information associated with the group of data bits (e.g., data bit group 320, payload). For example, the timing information may include timestamps associated with data included in the group of data bits (e.g., data bit group 320, payload). In an example, the group of data bits (e.g., data bit group 320, payload) may include a video information (e.g., a video frame) or audio information (e.g., an audio file). In some examples, the timing information may include timestamps associated with the video information or audio information. The group header information 330 may include QoS parameters associated with the group of data bits (e.g., data bit group 320, payload). In some aspects, the QoS parameters may be specified according to a traffic flow template (TFT) associated with communicating different groups of data bits (e.g., different data bit groups 320, different payloads) over the wireless communications system 300 (e.g., over the communication links 125). In some aspects, the TFT may include a mapping of the groups of data bits (e.g., data bit groups 320, payloads) to the QoS parameters. For example, the TFT may include an indication of which group of data bits (e.g., data bit group 320, payload) or groups of data bits (e.g., data bit groups 320, payloads) a set of QoS is applicable. In an example, the UE 115-a may transmit the TFT via the group header information 330.

In some aspects, the mapping of the groups of data bits (e.g., data bit groups 320, payloads) to the QoS parameters may be based on the antenna port identifiers (or antenna port numbers) associated with a transmitting device (e.g., the UE 115-a, the server 305, the base station 105-a, another UE 115). In some aspects, the mapping may be based on stream identifiers supportive of multiple streams of data. For example, the mapping may be based on identifiers respectively associated with data bits of the group of data bits (e.g., data bit group 320, payload). In some aspects, the mapping of the groups of data bits (e.g., data bit groups 320, payloads) to the QoS parameters may be based on routing addresses respectively associated with data bits of the group of data bits (e.g., data bit group 320, payload). In some other aspects, the mapping may be based on types (e.g., data types) respectively associated with the data bits of the group of data bits (e.g., data bit group 320, payload). In some examples, the QoS parameters may include an error rate 335 associated with the group of data bits (e.g., data bit group 320, payload). In an example, the error rate 335 may indicate a quantity of groups of data bits (e.g., data bit groups 320, payloads) received in error by a network device (e.g., the server 305, another UE 115, the base station 105-a). In another example, the QoS parameters may include a delay budget 340 associated with the group of data bits.

The error rate 335 may indicate a quantity of groups of data bits (e.g., data bit groups 320, payloads) received by a network device (e.g., the server 305, another UE 115, the base station 105-a) during a measurement window (e.g., a duration), in which the groups of data bits (e.g., data bit groups 320, payloads) are received outside of the delay budget 340 (e.g., after a time instance exceeding the delay budget 340). In some aspects, the delay budget 340 may include a delay between a UE-packet data convergence protocol (PDCP) and a user plane function (UPF). In some examples, for a delay budget 340 associated with a group of data bits (e.g., a data bit group 320, payload), the UE 115-a (or any network device in the wireless communications system 300, such as the server 305, the base station 105-a, or another UE 115) may target different delays (e.g., different delay budgets) for different data bits within the group of data bits (e.g., the data bit group 320, payload) so as to satisfy the delay budget 340.

The UE 115-a may set a target for adapting to the error rate 335, in which the error rate 335 indicates a quantity of groups of data bits (e.g., data bit groups 320, payloads) received in error. In an example, the UE 115-a may set a target for transmitting or retransmitting the group of data bits (e.g., data bit groups 320, payloads) based on the error rate 335. For example, the UE 115-a may set one or more RLC parameters based on the error rate 335. In some examples, the UE 115-a may transmit or retransmit groups of data bits (e.g., data bit groups 320, payloads) based on the RLC parameters. In an example, the UE 115-a may transmit groups of data bits (e.g., data bit groups 320, payloads) to a network device (e.g., the server 305, another UE 115, the base station 105-a). The UE 115-a may receive feedback information (e.g., HARQ feedback such as a positive acknowledgement (ACK) or a negative acknowledgement (NACK)) from the network device associated with the transmission of the groups of data bits (e.g., data bit groups 320, payloads). In an example, the UE 115-a may determine whether a quantity of groups of data bits (e.g., data bit groups 320, payloads) satisfy the error rate 335. For example, based on the feedback information, the UE 115-a may determine that a quantity of groups of data bits (e.g., data bit groups 320, payloads) received in error by the network device exceeds the error rate 335.

The UE 115-a may transmit (or retransmit), to the network device, one or more groups of data bits (e.g., one or more data bit groups 320, payloads) which were received in error by the network device (e.g., as indicated by a feedback message from the network device). In an example, the UE 115-a may determine whether a quantity of groups of data bits (e.g., data bit groups 320, payloads) included in the transmission (or retransmission) satisfy the error rate 335. The UE 115-a may again transmit (or retransmit) one or more groups of data bits (e.g., one or more data bit groups 320, payloads). For example, the UE 115-a may retransmit one or more groups of data bits (e.g., one or more data bit groups 320, payloads) based on whether the one or more groups of data bits (e.g., one or more data bit groups 320, payloads) satisfy the error rate 340. In some other aspects, the UE 115-a may set a target for adapting to the delay budget 340 with reference to a measurement window (e.g., a duration). For example, the UE 115-a may set a target for transmitting (or retransmitting) the group of data bits (e.g., data bit groups 320, payloads) based on whether the group of data bits (e.g., data bit groups 320, payloads) are received by a network device (e.g., the server 305, another UE 115, the base station 105-a) within the delay budget 340. In an example, the UE 115-a may transmit or retransmit groups of data bits (e.g., data bit groups 320, payloads) to the network device.

In an example, the UE 115-a may determine whether a quantity of groups of data bits (e.g., data bit groups 320, payloads) satisfy the delay budget 340 during the measurement window (e.g., duration). For example, the UE 115-a may determine that a quantity of groups of data bits (e.g., data bit groups 320, payloads) were received by the network device outside of the delay budget 340 (e.g., after a time instance exceeding the delay budget 340). In an example, the UE 115-a may receive feedback information (e.g., HARQ feedback) indicating whether one or more groups of data bits (e.g., data bit groups 320, payloads) were received by the network device outside of the delay budget 340 (e.g., after a time instance exceeding the delay budget 340).

The UE 115-a may transmit (or retransmit), to the network device, one or more groups of data bits (e.g., one or more data bit groups 320, payloads) which were received outside of the delay budget 340. In an example, the UE 115-a may determine whether a quantity of groups of data bits (e.g., data bit groups 320, payloads) included in the transmission (or retransmission) are received outside the delay budget 340. For example, the UE 115-a may receive feedback information (e.g., HARQ feedback) indicating whether one or more transmitted (or retransmitted) groups of data bits (e.g., data bit groups 320, payloads) were received by the network device outside of the delay budget 340 (e.g., after a time instance exceeding the delay budget 340). The UE 115-a may again transmit (or retransmit) one or more groups of data bits (e.g., one or more data bit groups 320, payloads), based on the indication.

In some aspects, the QoS parameters may include timing information associated with the group of data bits (e.g., data bit group 320, payload). The timing information may include a discard time 345 associated with retaining the group of data bits (e.g., data bit group 320, payload). In an example, a receiving device (e.g., UE 115-a, base station 105-a, server 305, another UE 115) which receives the group of data bits (e.g., data bit group 320, payload) may discard the group of data bits (e.g., data bit group 320, payload) based on whether the group of data bits (e.g., data bit group 320, payload) are received beyond the discard time 345. In an example, the receiving device (e.g., UE 115-a, base station 105-a, server 305, another UE 115) may retain the group of data bits (e.g., data bit group 320, payload) in a queue beyond the delay budget 340, for example, up to the discard time 345. For example, the duration of the discard time 345 may be greater than the duration of the delay budget 340. The discard time 345 thus may include a period (e.g., a time) from ingress of the group of data bits at a specified node (e.g., a 5G node) to the group of data bits being deemed not required for transmission, if not already transmitted.

For example, the receiving device (e.g., UE 115-a, base station 105-a, server 305, another UE 115) may retain the group of data bits (e.g., data bit group 320, payload) for decoding of a subsequent group of data bits (e.g., a subsequent data bit group 320, payload), even for cases in which the group of data bits (e.g., data bit group 320, payload) is unavailable within the delay budget 340. For example, the group of data bits (e.g., data bit group 320, payload) may be received after the delay budget 340, and video data (e.g., video frame data) included in the group of data bits (e.g., data bit group 320, payload) may be unavailable for display at the receiving device. The receive device (e.g., UE 115-a, base station 105-a, server 305, another UE 115) may retain the video data (e.g., video frame data) for decoding subsequent video data, such as with inter frame prediction involving intra-coded frames (I-frames) and predicted frames (P-frames).

The QoS parameters may include content policy information 350 associated with the group of data bits (e.g., data bit group 320, payload). In an example, the content policy information 350 may be indicative of bit priorities associated with the group of data bits (e.g., data bit group 320, payload). In some aspects, the UE 115-a may assign bit priorities to data bits of the group of data bits (e.g., data bit group 320, payload) based on content associated with the data bits. In some examples, the content policy information 350 may include a policy that a group of data bits (e.g., data bit group 320, payload) is to be retained by a receiving device (e.g., UE 115-a, base station 105-a, server 305, another UE 115) if all data bits within the group of data bits (e.g., data bit group 320, payload) are successfully received. In some aspects, the policy may be applied to a group of data bits (e.g., data bit group 320, payload) corresponding to a video frame "slice." In some aspects, the policy may provide for error concealment for the entire video frame "slice."

The content policy information 350 may include a policy that a group of data bits (e.g., data bit group 320, payload) is to be retained by a receiving device (e.g., UE 115-a, base station 105-a, server 305, another UE 115) up to a first data bit which is unsuccessfully received (e.g., received in error). In some aspects, the policy may be applied to an encoding-decoding mode in which a decoding device (e.g., a receiving device) retains data bits of a group of data bits (e.g., data bit group 320, payload), up to the first data bit in error. In an example, the decoding device (e.g., a receiving device) the retained data bits may include or exclude the first data bit in error. In some other examples, the content policy information 350 may include a policy that a group of data bits (e.g., data bit group 320, payload) is to be retained by a receiving device (e.g., UE 115-a, base station 105-a, server 305, another UE 115) if an error tolerance (e.g., X %) of data bits within the group of data bits (e.g., data bit group 320, payload) are successfully received. In an example, 'X' may be a sub-parameter included within the content policy information 350. In some aspects, the policy may be applied to example cases in which application forward error correction is applied to a group of data bits (e.g., data bit group 320, payload) according to the error tolerance (X %).

One or more of the UE 115-a, the server 305, and the base station 105-a may function as a processing point for processing groups of data bits (e.g., data bit groups 320, payloads, "chunks"). In some other aspects, one or more of the UE 115-a, the server 305, and the base station 105-a may function as a processing point for processing data packets (e.g., data packets 210 as described with reference to FIG. 2). In some aspects, as the number of network devices (e.g., UE 115-a, server 305, base station 105-a) increases, latency within the wireless communications system 300 may be decrease. In an example of communication in the wireless communications system 300, data packets (e.g., data packets 210) may be communicated between the server 305 and the base station 105-a. For example, data packets (e.g., data packets 210) may be transported over the communications link 125-a). In some examples, groups of data bits (e.g., data bit groups 320, payload, "chunks") may be communicated between the base station 105-a and the UE 115-a. For example, groups of data bits (e.g., data bit groups 320, payload, "chunks") may be transported over the communications link 125-b. In another example, groups of data bits (e.g., data bit groups 320, payload, "chunks") may be communicated between the server 305, the base station 105-a, and the UE 115-a. For example, groups of data bits (e.g., data bit groups 320, payload, "chunks") may be transported over the communications link 125-a and the communications link 125-b).

The described examples utilizing the transmission (or transport) of groups of data bits (e.g., data bit group 320) and an established bit group PDU session may provide several advantages over other packet based transmission techniques (e.g., IP packet processing, Jumbogram IP packet processing). For example, examples of aspects of the described techniques may provide a reduction in latency compared to some IP packet processing techniques. In some examples, the amount of header information (e.g., quantity of headers) may be reduced compared to IP packet processing. In some other examples, the type of header may include a reduced format (e.g., simplified header) compared to Jumbogram IP packet processing techniques. In some other aspects, the described examples utilizing the transmission (or transport) of groups of data bits (e.g., data bit group 320) and an established bit group PDU session may provide implicit power savings compared to some IP packet processing techniques. For example, in some IP packet processing techniques, power reduction may involve aggregated scheduling (e.g., explicit aggregation of packets, explicit aggregation of packets for fragmented IP packets).

Figure 4:
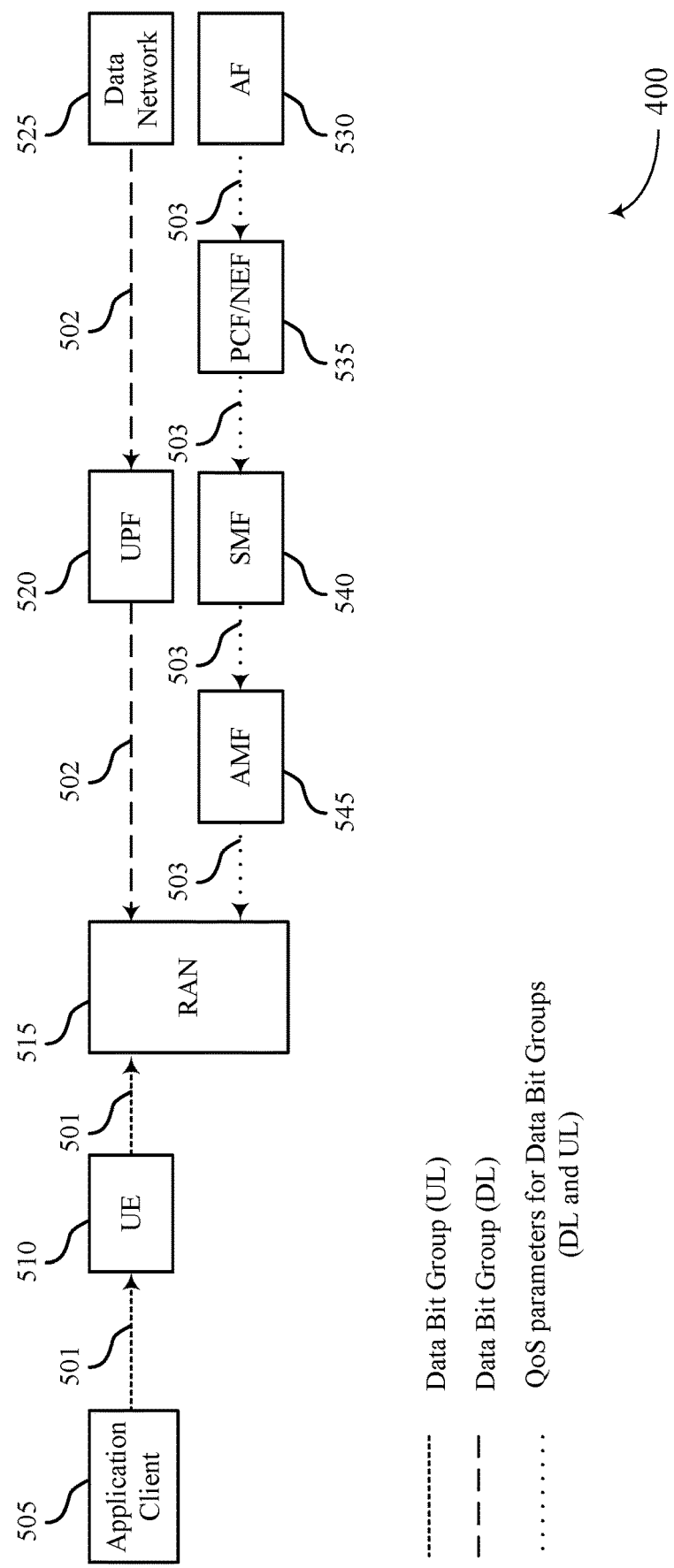
FIG. 4 illustrates an example of QoS parameters that support group-based wireless communications in accordance with aspects of the present disclosure.

FIG. 4 illustrates an example of communicating QoS parameters 400 on a control path that supports group-based wireless communications in accordance with aspects of the present disclosure. In the example of FIG. 4, an uplink data bit group 501 (e.g., group of data bits) may be communicated from an application client 505 to a UE 510. The UE 510 may be an example of aspects of a UE 115 or a UE 115-a described with reference to FIGS. 1 and 3. A downlink data bit group 502 (e.g., group of data bits) may be communicated from a data network 525 to a user plane function (UPF) 520. The downlink data bit group 502 may be communicated from the UPF 520 to a radio access network (RAN) 515. The uplink data bit group 501 and the downlink data bit group 502 may include examples of aspects of a data bit group 215, a data bit group 220, a data bit group 225, or a data bit group 320 as described with reference to FIGS. 2 and 3. The RAN 515 may include examples of aspects of the wireless communications system 100 or the wireless communications system 300 described with reference to FIGS. 1 and 3.

The QoS parameters 503 (e.g., error rate, delay budget, discard time, content policy information) may be communicated from assured forwarding (AF) 530 to a path computation client (PCC)/network exposure function (NEF) 535, from the PCC/NEF 535 to a session management function (SMF) 540, from the SMF 540 to an access and mobility management function (AMF) 545, and from the AMF 545 to the RAN 515. The QoS parameters 503 may be associated with the uplink data bit group 501 and downlink data bit group 502. In some systems, the QoS parameters 503 communicated over the control path may include an error rate, a delay budget, a discard time, and content policy information applicable to all data bit groups of a flow (e.g., all data bit groups communicated over the control path, for example, the uplink data bit group 501 and the downlink data bit group 502).

In contrast, the QoS parameters (e.g., error rate 335, delay budget 340, discard time 345, content policy information 350) described with reference to FIG. 3B may be respectively applied to different groups of data bits (e.g., data bit groups 320). For example, with reference to FIG. 3B, a set of QoS parameters may be applied to a group of data bits (e.g., a data bit group 320), and a different set of QoS parameters may be applied to a different group of data bits (e.g., a different data bit group 320). That is, QoS parameters may be dynamic with respect to a group of data bits (e.g., a data bit group 320) communicated over a data path.

Referring to FIG. 3B, the error rate 335 may be varied, for example, based on a type of a group of data bits (e.g., a data bit group 320). In some aspects, forward error correction may be varied based on the type of the group of data bits (e.g., data bit group 320). For example, an error rate 335 for a group of data bits (e.g., a data bit group 320) corresponding to an I-frame may be different from an error rate 335 for a different group of data bits (e.g., a different data bit group 320) corresponding to a P-frame. In some examples, the delay budget 340 may be varied by an application on a device (e.g., UE 115-a, server 305, base station 105-a) based on an end-to-end latency or delay. In some examples, the discard time 345 may be varied such that a discard time 345 for a group of data bits (e.g., a data bit group 320) corresponding to an I-frame may be different from a discard time 345 for a different group of data bits (e.g., a different data bit group 320) corresponding to a P-frame. In some other examples, the content policy information 350 may be varied based on forward error correction strength. For example, the content policy information 350 may be varied to be more or less restrictive based on forward error correction strength.

Figure 5:
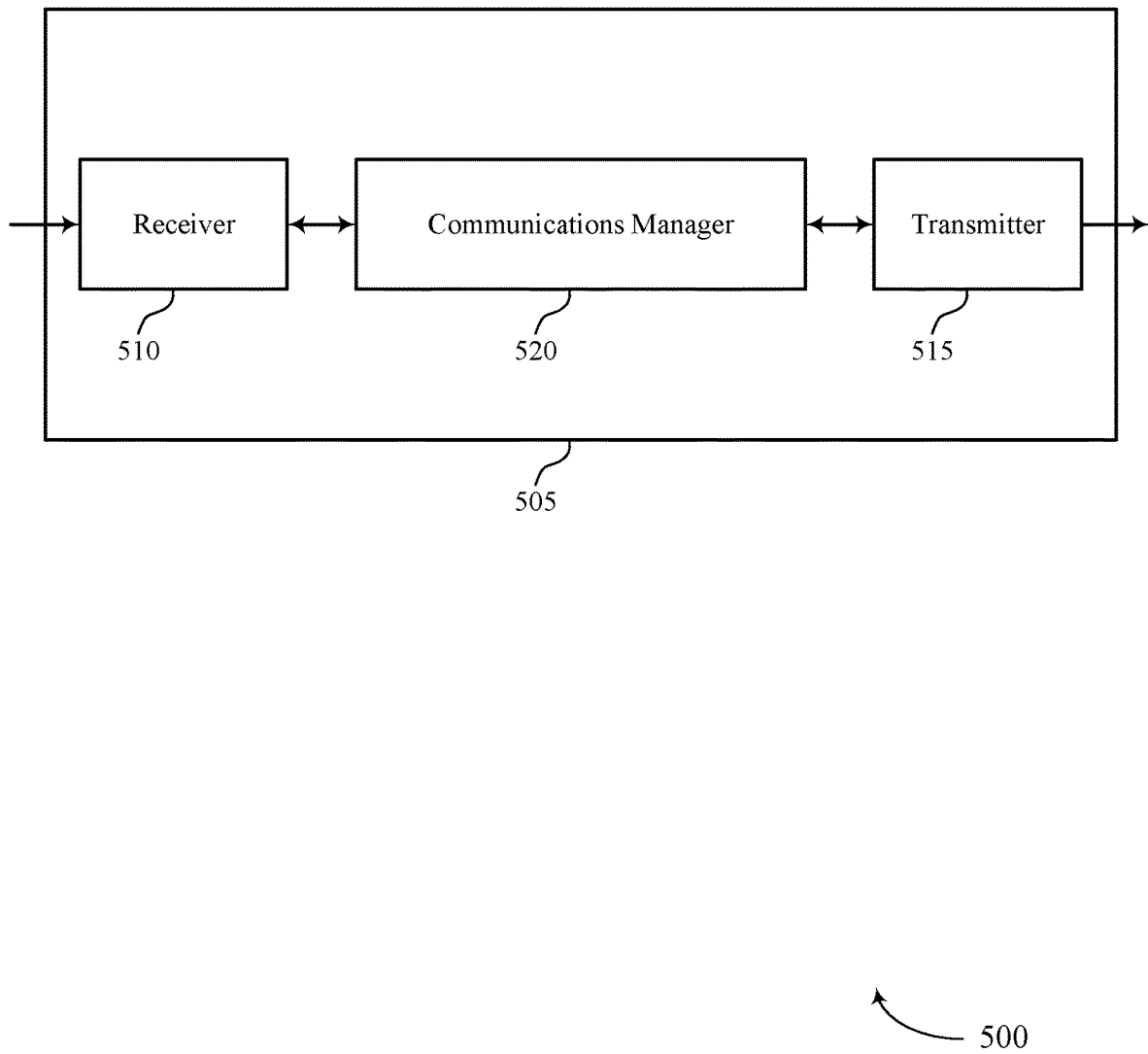
FIGS. 5 and 6 show block diagrams of devices that support group-based wireless communications in accordance with aspects of the present disclosure.

FIG. 5 shows a block diagram 500 of a device 505 that supports group-based wireless communications in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to group-based wireless communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to group-based wireless communications). In some examples, the transmitter 515 may be co-located with a receiver 510 in a transceiver component. The transmitter 515 may utilize a single antenna or a set of multiple antennas.

The communications manager 520, the receiver 510, the transmitter 515, or various combinations thereof or various components thereof may be examples of means for performing various aspects of group-based wireless communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

For example, the communications manager 520 may be configured as or otherwise support a means for aggregating a set of multiple data bits into a group of data bits associated with an application on the first device. The communications manager 520 may be configured as or otherwise support a means for determining a set of quality of service parameters associated with the group of data bits. The communications manager 520 may be configured as or otherwise support a means for transmitting the group of data bits to a second device in the wireless communication system, the group of data bits including group header information including the set of quality of service parameters.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, reduced latency, and more efficient utilization of communication resources.

Figure 6:
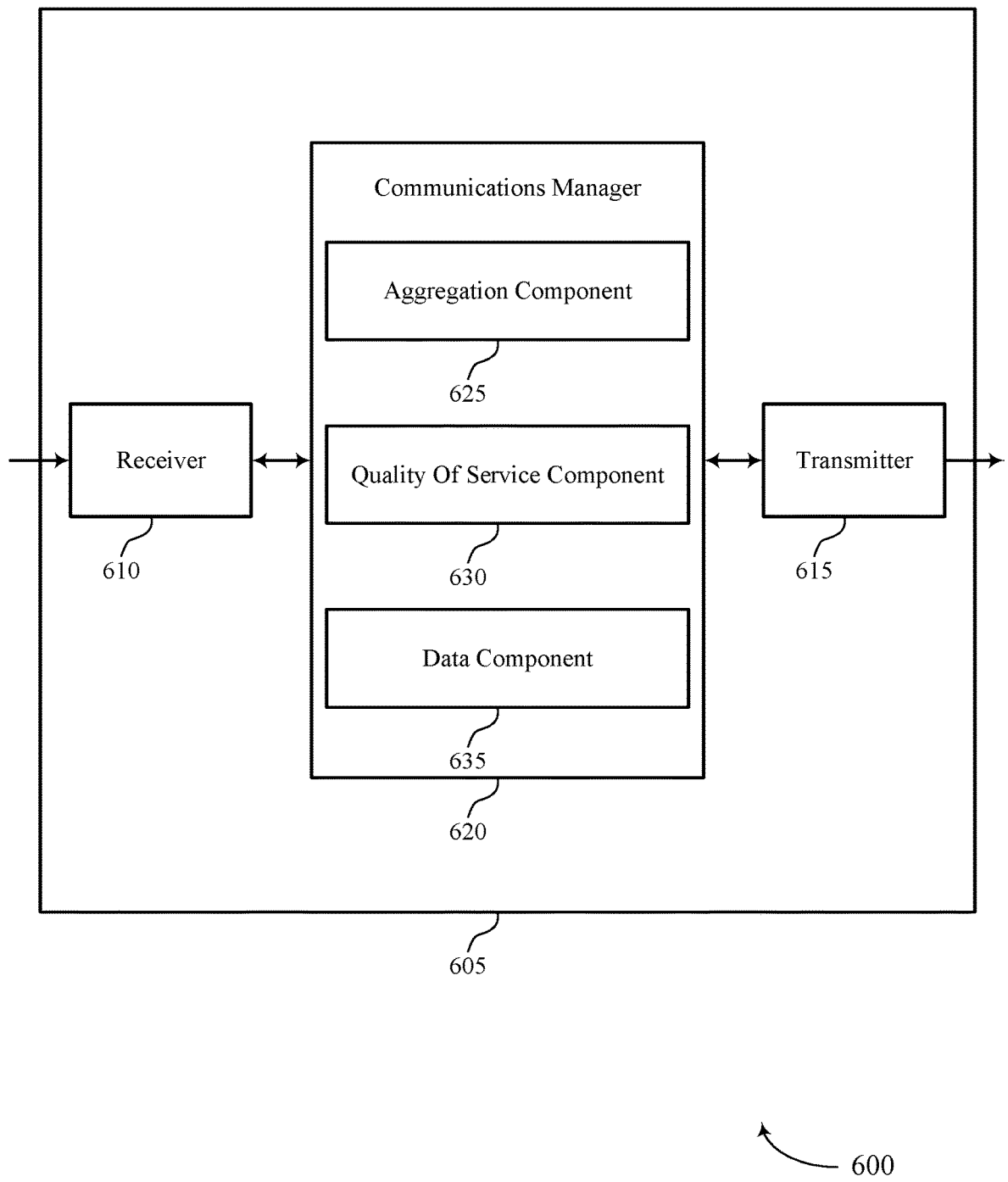

FIG. 6 shows a block diagram 600 of a device 605 that supports group-based wireless communications in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to group-based wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to group-based wireless communications). In some examples, the transmitter 615 may be co-located with a receiver 610 in a transceiver component. The transmitter 615 may utilize a single antenna or a set of multiple antennas.

The device 605, or various components thereof, may be an example of means for performing various aspects of group-based wireless communications as described herein. For example, the communications manager 620 may include an aggregation component 625, a quality of service component 630, a data component 635, or any combination thereof.

The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The aggregation component 625 may be configured as or otherwise support a means for aggregating a set of multiple data bits into a group of data bits associated with an application on the first device. The quality of service component 630 may be configured as or otherwise support a means for determining a set of quality of service parameters associated with the group of data bits. The data component 635 may be configured as or otherwise support a means for transmitting the group of data bits to a second device in the wireless communication system, the group of data bits including group header information including the set of quality of service parameters.

Figure 7:
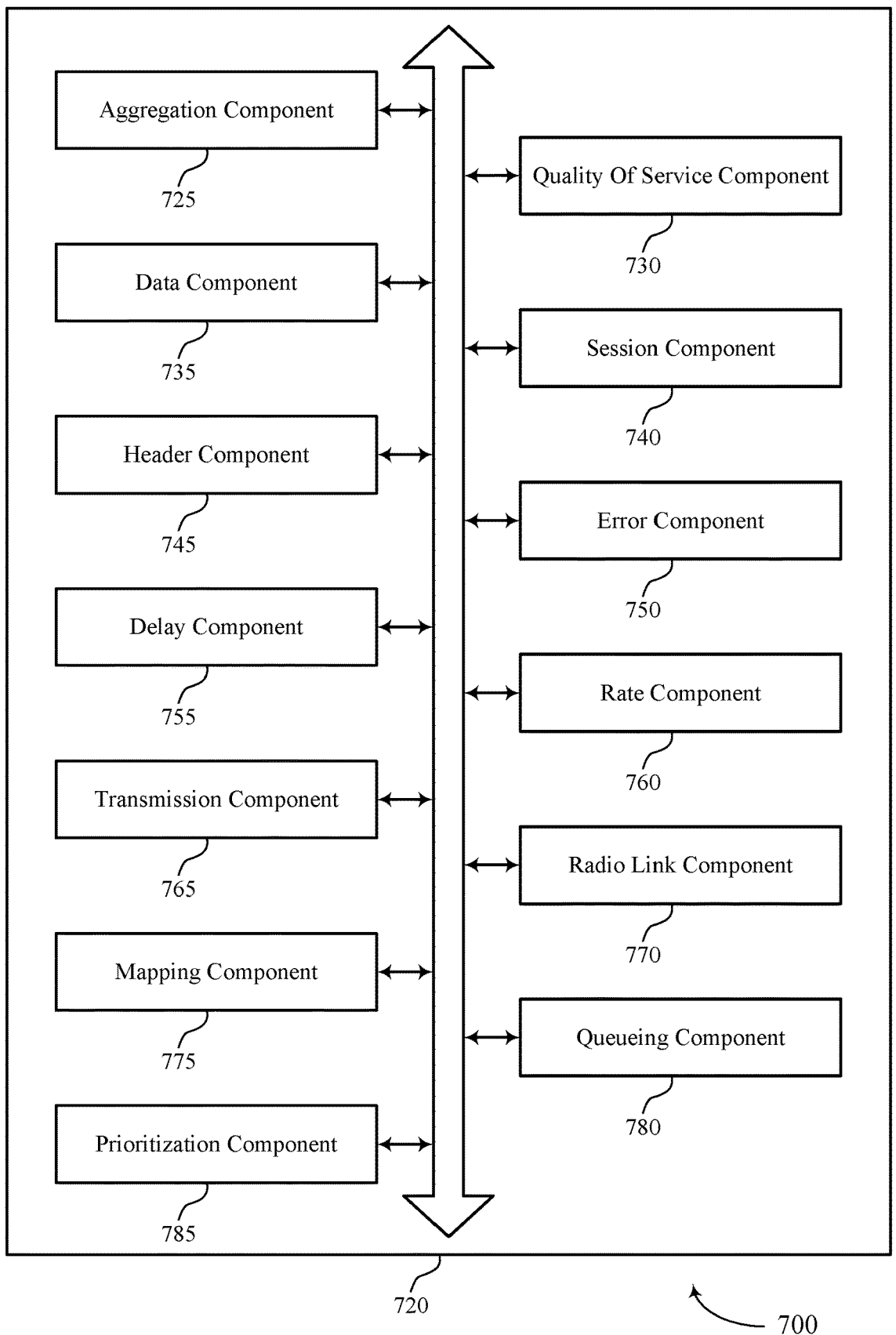
FIG. 7 shows a block diagram of a communications manager that supports group-based wireless communications in accordance with aspects of the present disclosure.

FIG. 7 shows a block diagram 700 of a communications manager 720 that supports group-based wireless communications in accordance with aspects of the present disclosure. The communications manager 720 may be an example of aspects of a communications manager 520, a communications manager 620, or both, as described herein. The communications manager 720, or various components thereof, may be an example of means for performing various aspects of group-based wireless communications as described herein. For example, the communications manager 720 may include an aggregation component 725, a quality of service component 730, a data component 735, a session component 740, a header component 745, an error component 750, a delay component 755, a rate component 760, a transmission component 765, a radio link component 770, a mapping component 775, a queueing component 780, a prioritization component 785, or any combination thereof. Each of these components may communicate, directly or indirectly, with one another (e.g., via one or more buses).

The aggregation component 725 may be configured as or otherwise support a means for aggregating a set of multiple data bits into a group of data bits associated with an application on the first device. The quality of service component 730 may be configured as or otherwise support a means for determining a set of quality of service parameters associated with the group of data bits. The data component 735 may be configured as or otherwise support a means for transmitting the group of data bits to a second device in the wireless communication system, the group of data bits including group header information including the set of quality of service parameters. The session component 740 may be configured as or otherwise support a means for establishing a data group protocol data unit session between the first device and the second device. In some examples, to transmit the group of data bits, the data component 735 may be configured as or otherwise support a means for transmitting the group of data bits to the second device in the wireless communication system based on the data group protocol data unit session.

The header component 745 may be configured as or otherwise support a means for transmitting, in a header associated with the group of data bits, protocol layer information and the group header information, where the protocol layer information includes transport layer information associated with the group of data bits. In some examples, the data component 735 may be configured as or otherwise support a means for refraining from packetizing the group of data bits, where aggregating the set of multiple data bits into the group of data bits is based on the refraining from packetizing the group of data bits. In some examples, the error component 750 may be configured as or otherwise support a means for determining that a quantity of groups of data bits satisfy an error rate associated with the group of data bits during a duration. In some examples, the error rate corresponds to a ratio of the quantity of groups of data bits that include at least one data bit in error to the number of groups of data bits transmitted over the duration. In some examples, the data component 735 may be configured as or otherwise support a means for retransmitting the group of data bits to the second device in the wireless communication system based on the quantity of groups of data bits satisfying the error rate.

The delay component 755 may be configured as or otherwise support a means for determining that a quantity of groups of data bits satisfy the delay budget associated with the group of data bits during a duration. In some examples, the data component 735 may be configured as or otherwise support a means for retransmitting the group of data bits to the second device in the wireless communication system based on the quantity of groups of data bits satisfying the delay budget. In some examples, the rate component 760 may be configured as or otherwise support a means for determining a value of a transmission parameter based on an error rate associated with the group of data bits. In some examples, to transmit the group of data bits, the data component 735 may be configured as or otherwise support a means for transmitting the group of data bits to the second device in the wireless communication system based on the value of the transmission rate parameter. In some examples, the transmission parameter comprises a modulation and coding scheme parameter, a transmission block error rate parameter, a power control parameter, or a link adaptation parameter, or a combination thereof.

The transmission component 765 may be configured as or otherwise support a means for determining a value of a transmission parameter based on an error rate associated with the group of data bits, the transmission parameter corresponding to a quantity of transmissions of the group of data bits. In some examples, to transmit the group of data bits, the data component 735 may be configured as or otherwise support a means for transmitting the group of data bits to the second device in the wireless communication system based on the value of the transmission parameter. In some examples, the radio link component 770 may be configured as or otherwise support a means for determining a value of a radio link control parameter based on an error rate associated with the group of data bits. In some examples, to transmit the group of data bits, the data component 735 may be configured as or otherwise support a means for transmitting the group of data bits to the second device in the wireless communication system based on the value of the radio link control parameter. In some examples, a delay budget associated with the group of data bits includes a delay from a time of ingress of a first data bit or a last data bit of the group of data bits at a specified node till an egress of the first data bit or the last data bit of the group of data bits at the specified node.

The mapping component 775 may be configured as or otherwise support a means for mapping the group of data bits to one or more quality of service parameters of the set of quality of service parameters. In some examples, the data component 735 may be configured as or otherwise support a means for transmitting, to the second device, an indication of the mapping of the group of data bits to the one or more quality of service parameters of the set of quality of service parameters over a control plane or in the group header information, where transmitting the group of data bits to the second device is based on the indication. In some examples, to support mapping the group of data bits, the mapping component 775 may be configured as or otherwise support a means for mapping the group of data bits to the one or more quality of service parameters of the set of quality of service parameters based on a routing address associated with one or more data bits of the group of data bits, an identifier associated with streaming the one or more data bits of the group of data bits, an antenna port associated with streaming the one or more data bits of the group of data bits, a type associated with the one or more data bits of the group of data bits, a timestamp associated with the one or more data bits of the group of data bits, or a combination thereof. In some examples, the set of quality of service parameters include an error rate associated with the group of data bits, a delay budget associated with the group of data bits, timing information associated with the group of data bits, or content policy information associated with the group of data bits, or a combination thereof.

The queueing component 780 may be configured as or otherwise support a means for storing the group of data bits in a queue for a duration based on the timing information, where the duration is greater than a period associated with the delay budget. In some examples, the prioritization component 785 may be configured as or otherwise support a means for assigning a priority to at least one data bit of the group of data bits based on content associated with the at least one data bit. In some examples, the content policy information associated with the group of data bits includes a first indication of the priority assigned to the at least one data bit of the group of data bits. In some examples, the content policy information associated with the group of data bits includes a second indication indicating that the group of data bits are processed based at least in part on receiving all data bits of the group of data bits. In some examples, the content policy information associated with the group of data bits includes a third indication indicating that the group of data bits are processed up to a first bit in error of the group of data bits. In some examples, the content policy information associated with the group of data bits includes a fourth indication indicating that the group of data bits are processed based at least in part on receiving a target number of data bits of the group of data bits. In some examples, the target number of data bits is indicated in the content policy information. In some examples, the first device includes a UE and the second device includes an EDGE server. In some examples, the second device includes an EDGE server and the first device includes a UE.

Figure 8:
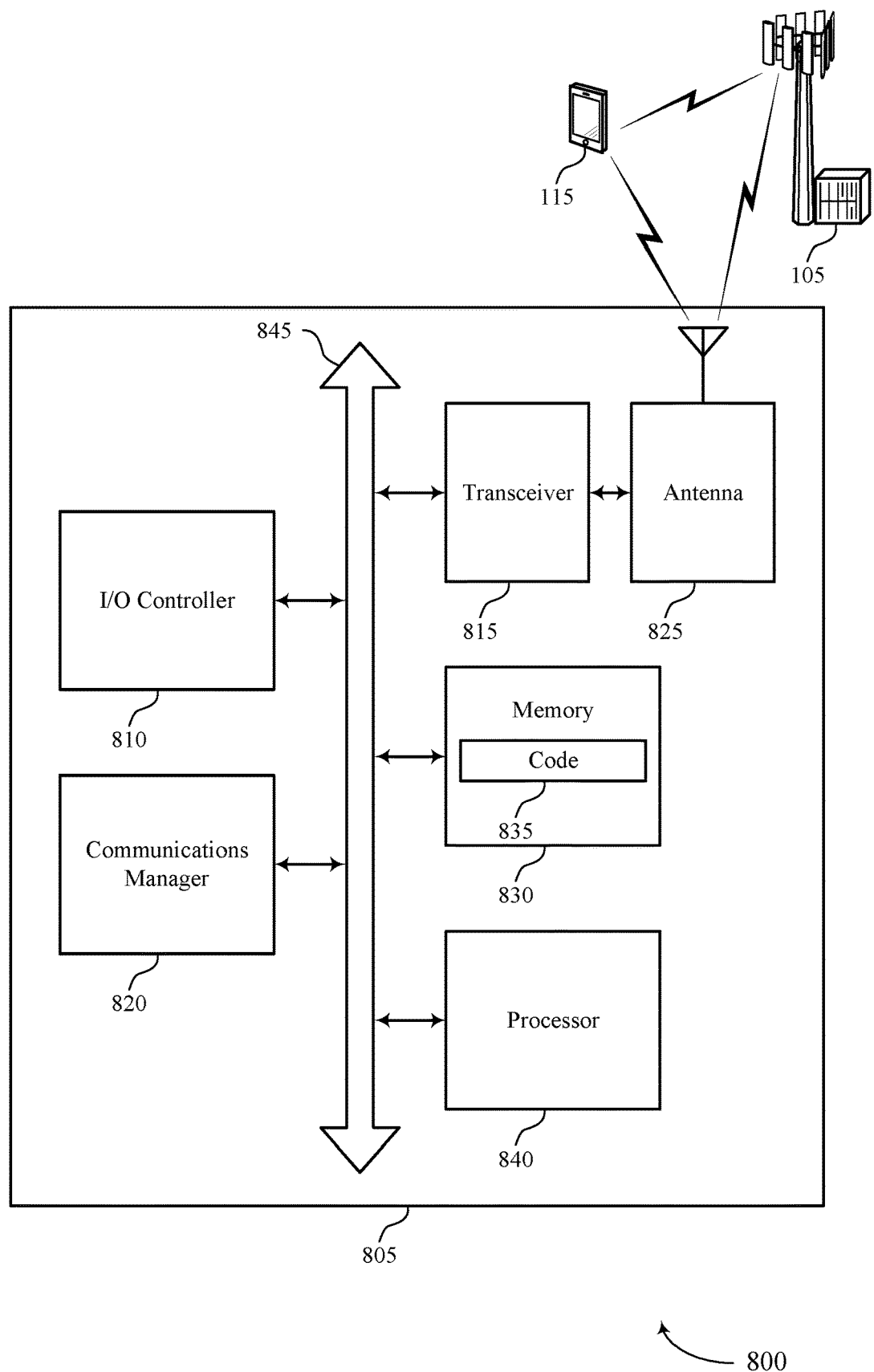
FIG. 8 shows a diagram of a system including a device that supports group-based wireless communications in accordance with aspects of the present disclosure.

FIG. 8 shows a diagram of a system 800 including a device 805 that supports group-based wireless communications in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting group-based wireless communications). For example, the device 805 or a component of the device 805 may include a processor 840 and memory 830 coupled to the processor 840, the processor 840 and memory 830 configured to perform various functions described herein.

For example, the communications manager 820 may be configured as or otherwise support a means for aggregating a set of multiple data bits into a group of data bits associated with an application on the first device. The communications manager 820 may be configured as or otherwise support a means for determining a set of quality of service parameters associated with the group of data bits. The communications manager 820 may be configured as or otherwise support a means for transmitting the group of data bits to a second device in the wireless communication system, the group of data bits including group header information including the set of quality of service parameters. By including or configuring the communications manager 820 in accordance with examples as described herein, the device 805 may support techniques for reduced latency, improved user experience related to reduced processing, reduced power consumption, and more efficient utilization of communication resources, improved coordination between devices (e.g., based on QoS parameters), longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of group-based wireless communications as described herein, or the processor 840 and the memory 830 may be otherwise configured to perform or support such operations.

Figure 9:
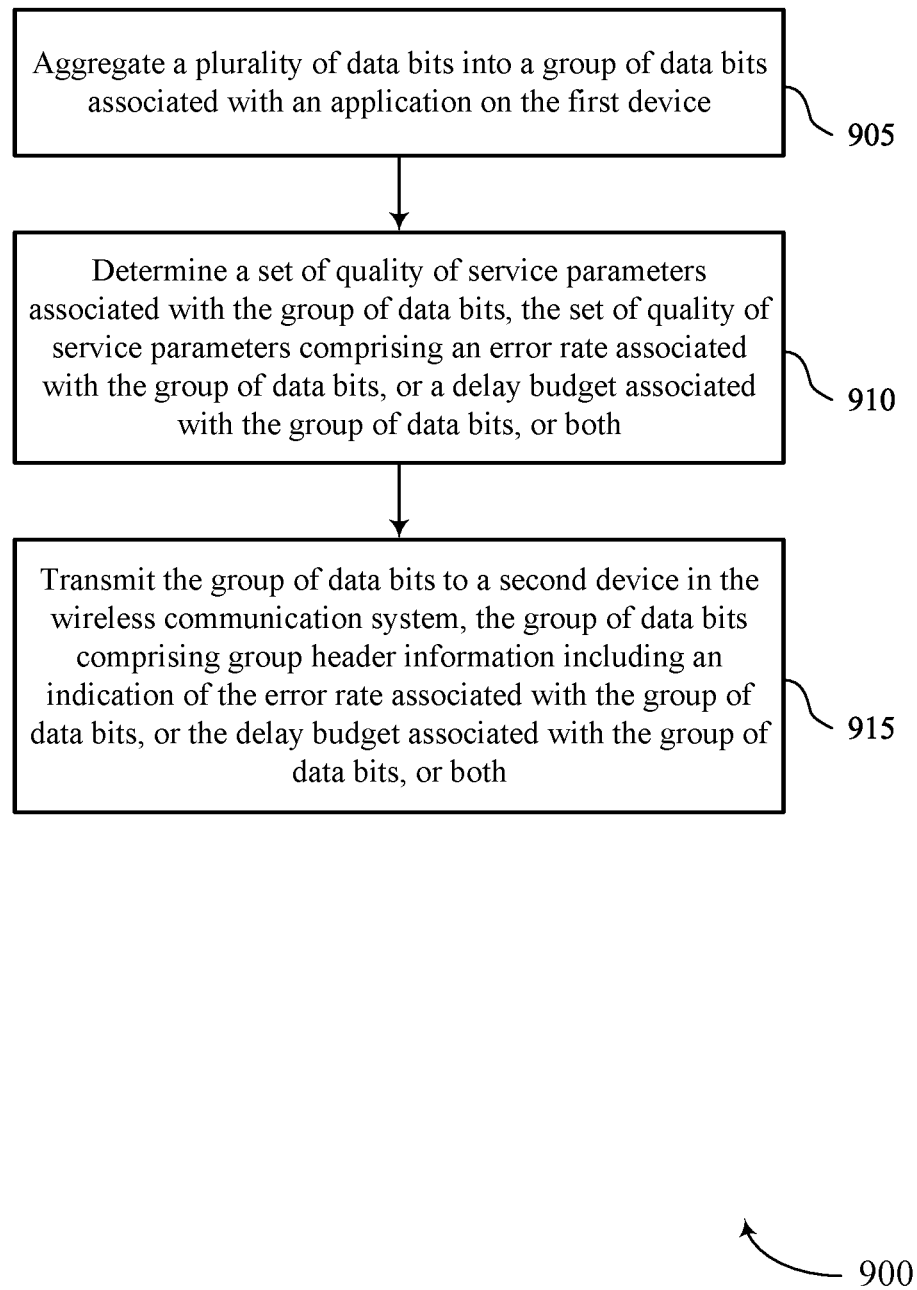
FIGS. 9 and 10 show flowcharts illustrating methods that support group-based wireless communications in accordance with aspects of the present disclosure.

FIG. 9 shows a flowchart illustrating a method 900 that supports group-based wireless communications in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include aggregating a set of multiple data bits into a group of data bits associated with an application on the first device. The operations of 905 may be performed in accordance with examples as disclosed herein. In some examples, aspects of the operations of 905 may be performed by an aggregation component 725 as described with reference to FIG. 7.

At 910, the method may include determining a set of quality of service parameters associated with the group of data bits. The operations of 910 may be performed in accordance with examples as disclosed herein. In some examples, aspects of the operations of 910 may be performed by a quality of service component 730 as described with reference to FIG. 7.

At 915, the method may include transmitting the group of data bits to a second device in the wireless communication system, the group of data bits including group header information including the set of quality of service parameters. The operations of 915 may be performed in accordance with examples as disclosed herein. In some examples, aspects of the operations of 915 may be performed by a data component 735 as described with reference to FIG. 7.

Figure 10:
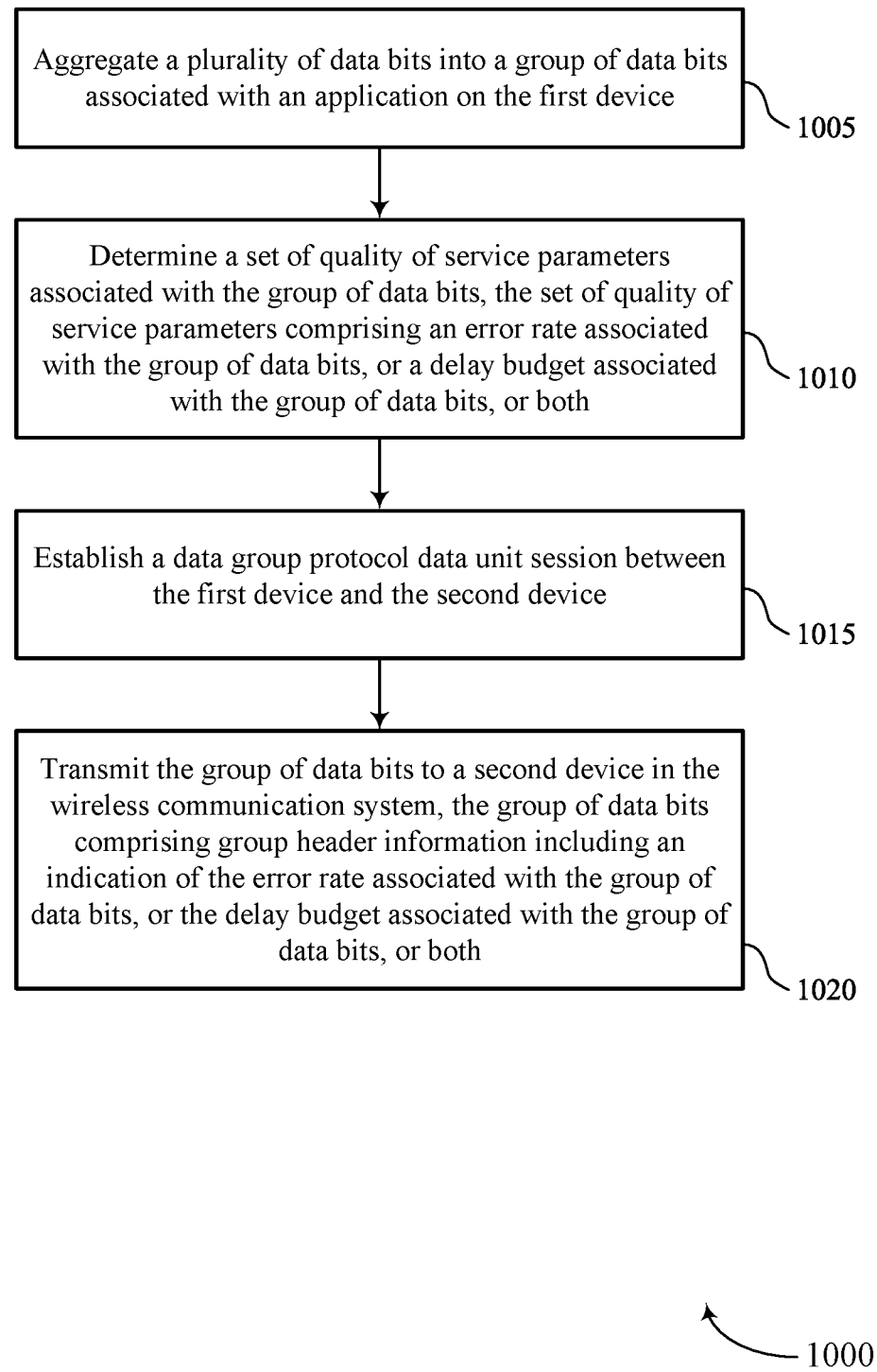

FIG. 10 shows a flowchart illustrating a method 1000 that supports group-based wireless communications in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include aggregating a set of multiple data bits into a group of data bits associated with an application on the first device. The operations of 1005 may be performed in accordance with examples as disclosed herein. In some examples, aspects of the operations of 1005 may be performed by an aggregation component 725 as described with reference to FIG. 7.

At 1010, the method may include determining a set of quality of service parameters associated with the group of data bits. The operations of 1010 may be performed in accordance with examples as disclosed herein. In some examples, aspects of the operations of 1010 may be performed by a quality of service component 730 as described with reference to FIG. 7.

At 1015, the method may include establishing a data group protocol data unit session between the first device and the second device. The operations of 1015 may be performed in accordance with examples as disclosed herein. In some examples, aspects of the operations of 1015 may be performed by a session component 740 as described with reference to FIG. 7.

At 1020, the method may include transmitting the group of data bits to a second device in the wireless communication system, the group of data bits including group header information including the set of quality of service parameters. In some examples, transmitting the group of data bits may include transmitting the group of data bits to the second device in the wireless communication system based on the data group protocol data unit session. The operations of 1020 may be performed in accordance with examples as disclosed herein. In some examples, aspects of the operations of 1020 may be performed by a data component 735 as described with reference to FIG. 7.

The following provides an overview of aspects of the present disclosure:

Aspect 1: A method of wireless communication at a first device in a wireless communication system, comprising: aggregating a plurality of data bits into a group of data bits associated with an application on the first device; determining a set of quality of service parameters associated with the group of data bits, the set of quality of service parameters comprising an error rate associated with the group of data bits, or a delay budget associated with the group of data bits, or both; and transmitting the group of data bits to a second device in the wireless communication system, the group of data bits comprising group header information including the set of quality of service parameters.

Aspect 2: The method of aspect 1, further comprising: establishing a data group protocol data unit session between the first device and the second device, wherein transmitting the group of data bits comprises: transmitting the group of data bits to the second device in the wireless communication system based at least in part on the data group protocol data unit session.

Aspect 3: The method of any of aspects 1 through 2, further comprising: transmitting, in a header associated with the group of data bits, protocol layer information and the group header information, wherein the protocol layer information comprises transport layer information associated with the group of data bits.

Aspect 4: The method of any of aspects 1 through 3, further comprising: refraining from packetizing the group of data bits, wherein aggregating the plurality of data bits into the group of data bits is based at least in part on the refraining from packetizing the group of data bits.

Aspect 5: The method of any of aspects 1 through 4, further comprising: determining that a quantity of groups of data bits satisfy the error rate associated with the group of data bits during a duration, wherein the error rate corresponds to a ratio of the quantity of groups of data bits that include at least one data bit in error to the number of groups of data bits transmitted over the duration, wherein transmitting the group of data bits comprises transmitting the group of data bits to the second device in the wireless communication system based at least in part on the quantity of groups of data bits satisfying the error rate.

Aspect 6: The method of any of aspects 1 through 5, further comprising: determining that a quantity of groups of data bits satisfy a delay budget associated with the group of data bits during a duration, wherein transmitting the group of data bits comprises transmitting the group of data bits to the second device in the wireless communication system based at least in part on the quantity of groups of data bits satisfying the delay budget.

Aspect 7: The method of any of aspects 1 through 6, further comprising: storing the group of data bits in a queue for a duration based at least in part on the timing information, wherein the duration is greater than a period associated with the delay budget.

Aspect 8: The method of any of aspects 1 through 7, further comprising: assigning a priority to at least one data bit of the group of data bits based at least in part on content associated with the at least one data bit, wherein the content policy information associated with the group of data bits comprises one or more of: a first indication of the priority assigned to the at least one data bit of the group of data bits, a second indication indicating that the group of data bits are processed based at least in part on receiving all data bits of the group of data bits, a third indication indicating that the group of data bits are processed up to a first bit in error of the group of data bits, or a fourth indication indicating that the group of data bits are processed based at least in part on receiving a target number of data bits of the group of data bits, wherein the target number of data bits is indicated in the content policy information.

Aspect 9: The method of any of aspects 1 through 6, further comprising: determining a value of a transmission parameter based at least in part on the error rate associated with the group of data bits, wherein transmitting the group of data bits comprises: transmitting the group of data bits to the second device in the wireless communication system based at least in part on the value of the transmission rate parameter.

Aspect 10: The method of aspect 9, wherein the transmission parameter comprises a modulation and coding scheme parameter, a transmission block error rate parameter, a power control parameter, or a link adaptation parameter, or a combination thereof.

Aspect 11: The method of any of aspects 1 through 10, wherein the delay budget associated with the group of data bits comprises a delay from a time of ingress of a first data bit or a last data bit of the group of data bits at a specified node till an egress of the first data bit or the last data bit of the group of data bits at the specified node.

Aspect 12: The method of any of aspects 1 through 11, further comprising: mapping the group of data bits to one or more quality of service parameters of the set of quality of service parameters; and transmitting, to the second device, an indication of the mapping of the group of data bits to the one or more quality of service parameters of the set of quality of service parameters over a control plane or in the group header information, wherein transmitting the group of data bits to the second device is based at least in part on the indication.

Aspect 13: The method of aspect 12, wherein mapping the group of data bits comprises: mapping the group of data bits to the one or more quality of service parameters of the set of quality of service parameters based at least in part on a routing address associated with one or more data bits of the group of data bits, an identifier associated with streaming the one or more data bits of the group of data bits, an antenna port associated with streaming the one or more data bits of the group of data bits, a type associated with the one or more data bits of the group of data bits, a timestamp associated with the one or more data bits of the group of data bits, or a combination thereof.

Aspect 14: The method of any of aspects 1 through 13, wherein the set of quality of service parameters comprise an error rate associated with the group of data bits, a delay budget associated with the group of data bits, timing information associated with the group of data bits, or content policy information associated with the group of data bits, or a combination thereof.

Aspect 15: The method of any of aspects 1 through 14, wherein the first device comprises an edge server and the second device comprises a UE.

Aspect 16: The method of any of aspects 1 through 14, wherein the first device comprises a UE and the second device comprises an edge server.

Aspect 17: An apparatus comprising a processor; memory coupled with the processor; and instructions stored in the memory and executable by the processor to cause the apparatus to perform a method of any of aspects 1 through 15.

Aspect 18: An apparatus comprising at least one means for performing a method of any of aspects 1 through 15.

Aspect 19: A non-transitory computer-readable medium storing code the code comprising instructions executable by a processor to perform a method of any of aspects 1 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method of wireless communication at a first device in a wireless communication system, comprising:
aggregating a plurality of data bits into a group of data bits associated with an application on the first device;
determining a set of quality of service parameters associated with the group of data bits; and
transmitting, to a second device in the wireless communication system, a bit group protocol data unit during a bit group protocol data unit session, the bit group protocol data unit comprising the group of data bits and a header associated with the group of data bits, the header comprising protocol layer information associated with transporting group header information and the group of data bits during the bit group protocol data unit session, the group header information including the set of quality of service parameters, an indication of a mapping of the group of data bits to the set of quality of service parameters, and policy information that indicates whether the group of data bits are processed based at least in part on a quantity of successfully received bits of the group of data bits by the second device, wherein the mapping of the group of data bits is based at least in part on a timestamp associated with one or more data bits of the group of data bits.

2. The method of claim 1, further comprising:
establishing a data group protocol data unit session between the first device and the second device, wherein transmitting the group of data bits comprises:
transmitting the group of data bits to the second device in the wireless communication system based at least in part on the data group protocol data unit session.

3. The method of claim 1, wherein the protocol layer information comprises transport layer information associated with the group of data bits.

4. The method of claim 1, wherein aggregating the plurality of data bits into the group of data bits comprises:
refraining from packetizing the plurality of data bits into a plurality of packets prior to transmitting the group of data bits to the second device.

5. The method of claim 1, further comprising:
determining that a quantity of groups of data bits satisfy an error rate associated with the group of data bits during a duration, wherein the error rate corresponds to a ratio of the quantity of groups of data bits that include at least one data bit in error to the quantity of groups of data bits transmitted over the duration, wherein transmitting the group of data bits comprises:
transmitting the group of data bits to the second device in the wireless communication system based at least in part on the quantity of groups of data bits satisfying the error rate.

6. The method of claim 1, further comprising:
determining that a quantity of groups of data bits satisfy a delay budget associated with the group of data bits during a duration, wherein transmitting the group of data bits comprises:
transmitting the group of data bits to the second device in the wireless communication system based at least in part on the quantity of groups of data bits satisfying the delay budget.

7. The method of claim 1, further comprising:
storing the group of data bits in a queue for a duration based at least in part on timing information, wherein the duration is greater than a period associated with a delay budget.

8. The method of claim 1, further comprising:
assigning a priority to at least one data bit of the group of data bits based at least in part on content associated with the at least one data bit, wherein:
the policy information corresponds to content policy information associated with the group of data bits, the content policy information comprising one or more of: a first indication of the priority assigned to the at least one data bit of the group of data bits, a second indication indicating that the group of data bits are processed based at least in part on receiving all data bits of the group of data bits, a third indication indicating that the group of data bits are processed up to a first bit in error of the group of data bits, or a fourth indication indicating that the group of data bits are processed based at least in part on receiving a target quantity of data bits of the group of data bits; and the target quantity of data bits is indicated in the content policy information.

9. The method of claim 1, further comprising:
determining a value of a transmission parameter based at least in part on an error rate associated with the group of data bits, wherein transmitting the group of data bits comprises:
transmitting the group of data bits to the second device in the wireless communication system based at least in part on the value of the transmission parameter.

10. The method of claim 9, wherein the transmission parameter comprises a modulation and coding scheme parameter, a transmission block error rate parameter, a power control parameter, or a link adaptation parameter, or a combination thereof.

11. The method of claim 1, wherein a delay budget associated with the group of data bits comprises a delay from a time of ingress of a first data bit or a last data bit of the group of data bits at a specified node till an egress of the first data bit or the last data bit of the group of data bits at the specified node.

12. The method of claim 1, further comprising:
mapping the group of data bits to one or more quality of service parameters of the set of quality of service parameters, wherein transmitting the group of data bits comprises:
transmitting, to the second device, the indication of the mapping of the group of data bits to the one or more quality of service parameters of the set of quality of service parameters over a control plane or in the group header information, wherein transmitting the group of data bits to the second device is based at least in part on the indication.

13. The method of claim 12, wherein mapping the group of data bits comprises:
mapping the group of data bits to the one or more quality of service parameters of the set of quality of service parameters based at least in part on a routing address associated with the one or more data bits of the group of data bits, an identifier associated with streaming the one or more data bits of the group of data bits, an antenna port associated with streaming the one or more data bits of the group of data bits, a type associated with the one or more data bits of the group of data bits, or a combination thereof.

14. The method of claim 1, wherein the set of quality of service parameters comprise an error rate associated with the group of data bits, a delay budget associated with the group of data bits, timing information associated with the group of data bits, or content policy information associated with the group of data bits, or a combination thereof.

15. The method of claim 1, wherein the first device comprises an edge server and the second device comprises a user equipment (UE).

16. The method of claim 1, wherein the first device comprises a user equipment (UE) and the second device comprises an edge server.

17. An apparatus in a wireless communication system, comprising:
one or more memories storing processor-executable code; and
one or more processors coupled with the one or more memories and operable to execute the code to cause the apparatus to:
aggregate a plurality of data bits into a group of data bits associated with an application on the apparatus;
determine a set of quality of service parameters associated with the group of data bits; and
transmit, to a second apparatus in the wireless communication system, a bit group protocol data unit during a bit group protocol data unit session, the bit group protocol data unit comprising the group of data bits and a header associated with the group of data bits, the header comprising protocol layer information associated with transporting group header information and the group of data bits during the bit group protocol data unit session, the group header information including the set of quality of service parameters, an indication of a mapping of the group of data bits to the set of quality of service parameters, and policy information that indicates whether the group of data bits are processed based at least in part on a quantity of successfully received bits of the group of data bits by the second apparatus, wherein the mapping of the group of data bits is based at least in part on a timestamp associated with one or more data bits of the group of data bits.

18. The apparatus of claim 17, wherein the one or more processors are further operable to execute the code to cause the apparatus to:
establish a data group protocol data unit session between the apparatus and the second apparatus, wherein to transmit the group of data bits the one or more processors are further operable to execute the code to cause the apparatus to:
transmit the group of data bits to the second apparatus in the wireless communication system based at least in part on the data group protocol data unit session.

19. The apparatus of claim 17, wherein the protocol layer information comprises transport layer information associated with the group of data bits.

20. An apparatus in a wireless communication system, comprising:
means for aggregating a plurality of data bits into a group of data bits associated with an application on the apparatus;
means for determining a set of quality of service parameters associated with the group of data bits; and
means for transmitting, to a second apparatus in the wireless communication system, a bit group protocol data unit during a bit group protocol data unit session, the bit group protocol data unit comprising the group of data bits and a header associated with the group of data bits, the header comprising protocol layer information associated with transporting group header information and the group of data bits during the bit group protocol data unit session, the group header information including the set of quality of service parameters, an indication of a mapping of the group of data bits to the set of quality of service parameters, and policy information that indicates whether the group of data bits are processed based at least in part on a quantity of successfully received bits of the group of data bits by the second apparatus, wherein the mapping of the group of data bits is based at least in part on a timestamp associated with one or more data bits of the group of data bits.

* * * * *